United States Patent
Liu

(10) Patent No.: US 9,811,725 B2
(45) Date of Patent: Nov. 7, 2017

(54) ITINERARY ESTIMATION DEVICE AND METHOD, NON-TRANSITORY COMPUTER-READABLE MEDIUM, AND INFORMATION CLASSIFICATION METHOD

(71) Applicant: FUJI XEROX CO., LTD., Tokyo (JP)

(72) Inventor: Yang Liu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 17 days.

(21) Appl. No.: 14/820,788

(22) Filed: Aug. 7, 2015

(65) Prior Publication Data

US 2016/0275346 A1 Sep. 22, 2016

(30) Foreign Application Priority Data

Mar. 20, 2015 (JP) ................. 2015-058239

(51) Int. Cl.
*G06K 9/00* (2006.01)
*G06Q 10/10* (2012.01)

(52) U.S. Cl.
CPC ....... *G06K 9/00456* (2013.01); *G06Q 10/109* (2013.01); *G06K 2209/01* (2013.01)

(58) Field of Classification Search
CPC ............. G06Q 10/109; G06K 9/00456; G06K 2209/01
See application file for complete search history.

(56) References Cited

U.S. PATENT DOCUMENTS

| 7,693,794 B2 * | 4/2010 | Wind ..................... | G06Q 10/02 705/44 |
| 8,503,797 B2 * | 8/2013 | Turkelson ......... | G06F 17/30707 358/1.18 |
| 8,675,232 B2 | 3/2014 | Asamoto et al. | |
| 2004/0083134 A1 * | 4/2004 | Spero ..................... | G06Q 20/20 705/16 |
| 2008/0208643 A1 * | 8/2008 | Guastalla ............... | G06Q 10/02 705/6 |
| 2014/0101002 A1 * | 4/2014 | Schmitt .................. | G06Q 40/10 705/30 |

FOREIGN PATENT DOCUMENTS

JP 2012-89033 A 5/2012

* cited by examiner

*Primary Examiner* — Daniel Mariam
(74) *Attorney, Agent, or Firm* — Sughrue Mion, PLLC

(57) ABSTRACT

An itinerary estimation device includes a classification unit and an estimation unit. The classification unit classifies multiple pieces of expense data including information related to expenses into one or more expense data groups, according to a chronological order of date information extracted from each of the multiple pieces of expense data. The estimation unit estimates an itinerary that includes at least dates on the basis of information including date information extracted from each piece of classified expense data included in the expense data group.

24 Claims, 18 Drawing Sheets

FIG. 1A
RECEIPT    D1

HAMBURGER SHOP AAA

RECEIPT

GINZA    03-1111-XXXX

..., GINZA, CHUO-KU, TOKYO

2/15/2015      1:44 p.m.

HAMBURGER    ¥300
DRINK    ¥100

TOTAL    ¥400

FIG. 1B
RECEIPT (HANDWRITTEN)    D2

RECEIPT

*BBB, CO.*

¥ *25,600–*

ITEM: *COMPUTER SOFTWARE*

*2/16/2015*

..., OSAKA, OSAKA PREFECTURE

PC SHOP DDDD

FIG. 1C
RECEIPT (LODGINGS)    D3

RECEIPT    ..., HAKATA-KU, FUKUOKA

TEL 092-222-XXXX

HOTEL AAA: HAKATA

| NAME: TARO YAMADA | | | | |
|---|---|---|---|---|
| ROOM NUMBER | GUESTS | CHECK-IN | CHECK-OUT | REMARKS |
| 0510 | 1 | 2/17/2015 | 2/21/2015 | |
| DATE | SUMMARY | | FEE | PAYMENT |
| 6.20 | LODGING CHARGE | | 6200 | 6200 |
| | TOTAL | | 6200 | 6200 |

2/21/2015

FIG. 1D
TICKET    D4

LIMITED EXPRESS

TOKYO → SHIN-OSAKA (6:00)      (8:30)

Feb. 15

AAA    CAR 1, SECTION XX,

EXPRESS    SEAT A    ¥13000

FIG. 1E
STATEMENT    D5

| DATE | EXPENSE ITEM | AMOUNT |
|---|---|---|
| 2/21/2015 | RESTAURANT AAA TOKYO | ¥5000 |
| ... | ... | ... |
| ... | ... | ... |
| ... | ... | ... |
| ... | ... | ... |

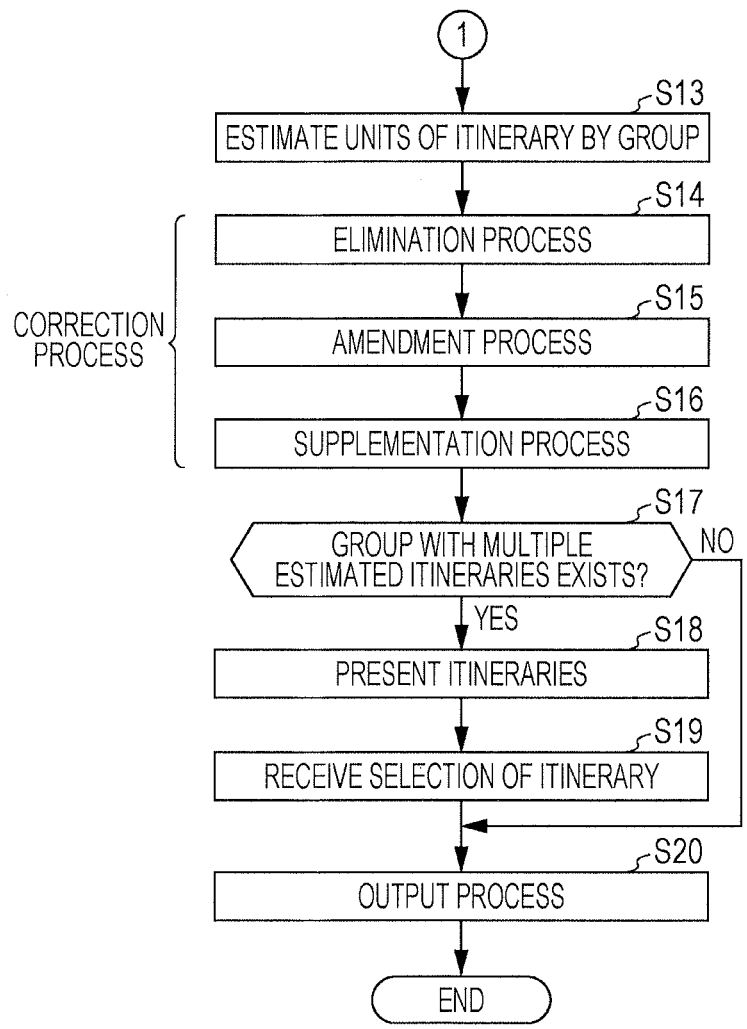

FIG. 6A

IN ORDER OF IMAGE CAPTURE

| ID | USER INFORMATION | DATE INFORMATION | LOCATION INFORMATION | ITEM INFORMATION | AMOUNT |
|---|---|---|---|---|---|
| 0001 | USER001 | 11/11/2014 13:34 | FUKUOKA | MEAL | 880 JPY |
| 0002 | USER001 | 11/11/2014 12:16 | OSAKA | MEAL | 1080 JPY |
| 0003 | USER001 | 11/16/2014 18:49 | TOKYO | MEAL | 1240 JPY |
| 0004 | USER001 | 09/22/2014 08:34 | TOKYO | TAXI | 2840 JPY |
| 0005 | USER001 | 10/10/2014 12:11 | TOKYO | MEAL | 985 JPY |
| 0006 | USER001 | 11/09/2014 | TOKYO | EXPRESS TRAIN | 13620 JPY |
| 0007 | USER001 | 11/14/2014 14:01 | KOBE | MEAL | 850 JPY |
| 0008 | USER001 | 11/11/2014 08:52 | OSAKA | MEAL | 1080 JPY |
| 0009 | USER001 | 09/21/2014 | ODAWARA | HOTEL | 7800 JPY |
| 0010 | USER001 | 09/20/2014 08:41 | TOKYO | MEAL | 1150 JPY |
| 0011 | USER001 | 11/12/2014 | KOBE | HOTEL | 8300 JPY |
| 0012 | USER001 | 11/13/2014 13:32 | UNKNOWN | TAXI | 1860 JPY |
| 0013 | USER001 | 10/06/2014 09:36 | TOKYO | MEAL | 790 JPY |
| 0014 | USER001 | 10/07/2014 | NAGOYA | HOTEL | 9000 JPY |
| 0015 | USER001 | 11/10/2014 15:17 | OSAKA | TAXI | 2350 JPY |

FIG. 6B

SORTED BY DATE INFORMATION

| ID | USER INFORMATION | DATE INFORMATION | LOCATION INFORMATION | ITEM INFORMATION | AMOUNT |
|---|---|---|---|---|---|
| 0010 | USER001 | 09/20/2014 08:41 | TOKYO | MEAL | 1150 JPY |
| 0009 | USER001 | 09/21/2014 | ODAWARA | HOTEL | 7800 JPY |
| 0004 | USER001 | 09/22/2014 08:34 | TOKYO | TAXI | 2840 JPY |
| 0013 | USER001 | 10/06/2014 09:36 | TOKYO | MEAL | 790 JPY |
| 0014 | USER001 | 10/07/2014 | NAGOYA | HOTEL | 9000 JPY |
| 0005 | USER001 | 10/10/2014 12:11 | TOKYO | MEAL | 985 JPY |
| 0006 | USER001 | 11/09/2014 | TOKYO | EXPRESS TRAIN | 13620 JPY |
| 0015 | USER001 | 11/10/2014 15:17 | OSAKA | TAXI | 2350 JPY |
| 0008 | USER001 | 11/11/2014 08:52 | OSAKA | MEAL | 1080 JPY |
| 0002 | USER001 | 11/11/2014 12:16 | OSAKA | MEAL | 1080 JPY |
| 0001 | USER001 | 11/11/2014 13:34 | FUKUOKA | MEAL | 880 JPY |
| 0011 | USER001 | 11/12/2014 | KOBE | HOTEL | 8300 JPY |
| 0012 | USER001 | 11/13/2014 13:32 | UNKNOWN | TAXI | 1860 JPY |
| 0007 | USER001 | 11/14/2014 14:01 | KOBE | MEAL | 850 JPY |
| 0003 | USER001 | 11/16/2014 18:49 | TOKYO | MEAL | 1240 JPY |

FIG. 7

HOMETOWN INFORMATION: TOKYO, TOKYO STATION, SHINAGAWA STATION

| ID | USER INFORMATION | DATE INFORMATION | LOCATION INFORMATION | ITEM INFORMATION | AMOUNT | HOMETOWN | GROUP |
|---|---|---|---|---|---|---|---|
| 0010 | USER001 | 09/20/2014 08:41 | TOKYO | MEAL | 1150 JPY | START POINT | G1 |
| 0009 | USER001 | 09/21/2014 | ODAWARA | HOTEL | 7800 JPY | – | G1 |
| 0004 | USER001 | 09/22/2014 08:34 | TOKYO | TAXI | 2840 JPY | END POINT | G1 |
| 0013 | USER001 | 10/06/2014 09:36 | TOKYO | MEAL | 790 JPY | START POINT | G2 |
| 0014 | USER001 | 10/07/2014 | NAGOYA | HOTEL | 9000 JPY | – | G2 |
| 0005 | USER001 | 10/10/2014 12:11 | TOKYO | MEAL | 985 JPY | END POINT | G2 |
| 0006 | USER001 | 11/09/2014 | TOKYO | EXPRESS TRAIN | 13620 JPY | START POINT | G3 |
| 0015 | USER001 | 11/10/2014 15:17 | OSAKA | TAXI | 2350 JPY | – | G3 |
| 0008 | USER001 | 11/11/2014 08:52 | OSAKA | MEAL | 1130 JPY | – | G3 |
| 0002 | USER001 | 11/11/2014 12:16 | OSAKA | MEAL | 1080 JPY | – | G3 |
| 0001 | USER001 | 11/11/2014 13:34 | FUKUOKA | MEAL | 880 JPY | – | G3 |
| 0011 | USER001 | 11/12/2014 | KOBE | HOTEL | 8300 JPY | – | G3 |
| 0012 | USER001 | 11/13/2014 13:32 | UNKNOWN | TAXI | 1860 JPY | – | G3 |
| 0007 | USER001 | 11/14/2014 14:01 | KOBE | MEAL | 850 JPY | – | G3 |
| 0003 | USER001 | 11/16/2014 18:49 | TOKYO | MEAL | 1240 JPY | END POINT | G3 |

FIG. 8

HOMETOWN INFORMATION: TOKYO, TOKYO STATION, SHINAGAWA STATION

| ID | USER INFORMATION | DATE INFORMATION | LOCATION INFORMATION | ITEM INFORMATION | AMOUNT | | HOMETOWN | GROUP |
|---|---|---|---|---|---|---|---|---|
| 0010 | USER001 | 09/20/2014 08:41 | TOKYO | MEAL | 1150 JPY | → | START POINT | G1 |
| 0009 | USER001 | 09/21/2014 | ODAWARA | HOTEL | 7800 JPY | → | – | G1 |
| 0004 | USER001 | 09/22/2014 08:34 | TOKYO | TAXI | 2840 JPY | → | END POINT | G1 |
| 0013 | USER001 | 10/06/2014 09:36 | TOKYO | MEAL | 790 JPY | → | START POINT | G2 |
| 0014 | USER001 | 10/07/2014 | NAGOYA | HOTEL | 9000 JPY | → | – | G2 |
| 0005 | USER001 | 10/10/2014 12:11 | TOKYO | MEAL | 985 JPY | → | END POINT | G2 |
| 0006 | USER001 | 11/09/2014 | TOKYO | EXPRESS TRAIN | 13620 JPY | → | START POINT | G3 |
| 0015 | USER001 | 11/10/2014 15:17 | OSAKA | TAXI | 2350 JPY | → | – | G3 |
| 0008 | USER001 | 11/10/2014 08:52 | OSAKA | MEAL | 1130 JPY | → | – | G3 |
| 0002 | USER001 | 11/11/2014 12:16 | OSAKA | MEAL | 1080 JPY | → | – | G3 |
| 0001 | USER001 | 11/11/2014 13:34 | FUKUOKA | MEAL | 880 JPY | → | – | G3 |
| 0011 | USER001 | 11/12/2014 | KOBE | HOTEL | 8300 JPY | → | – | G3 |
| 0012 | USER001 | 11/13/2014 13:32 | KOBE | TAXI | 1860 JPY | → | – | G3 |
| 0007 | USER001 | 11/14/2014 14:01 | KOBE | MEAL | 850 JPY | → | – | G3 |
| 0003 | USER001 | 11/16/2014 18:49 | TOKYO | MEAL | 1240 JPY | → | END POINT | G3 |

ELIMINATE (LOCATION)

FIG. 9

GROUP G1
ITINERARY 1:
09/20/2014 TOKYO
09/21/2014 ODAWARA (LODGING)
09/22/2014 TOKYO
ROUTE: TOKYO > ODAWARA > TOKYO
TRAVEL EXPENSES
MEALS: 1150 JPY
TRANSPORTATION: 2840 JPY
LODGING: 7800 JPY
TOTAL: 11790 JPY

GROUP G2
ITINERARY 2:
10/06/2014 TOKYO
10/07/2014-10/09/2014 NAGOYA (LODGING)
10/10/2014 TOKYO
ROUTE: TOKYO > NAGOYA > TOKYO
TRAVEL EXPENSES
MEALS: 1775 JPY
TRANSPORTATION: 0JPY
LODGING: 9000 JPY
TOTAL: 10775 JPY

GROUP G3
ITINERARY 3:
11/09/2014 TOKYO
11/10/2014-11/11/2014 OSAKA (LODGING)
11/12/2014-11/15/2014 KOBE (LODGING)
11/16/2014 TOKYO
ROUTE: TOKYO > OSAKA > KOBE > TOKYO
TRAVEL EXPENSES
MEALS: 4300 JPY
TRANSPORTATION: 17830JPY
LODGING: 8300 JPY
TOTAL: 30430 JPY

FIG. 11A

IN ORDER OF IMAGE CAPTURE

| ID | USER INFORMATION | DATE INFORMATION | LOCATION INFORMATION | ITEM INFORMATION | AMOUNT |
|---|---|---|---|---|---|
| 0001 | USER001 | 11/14/2014 09:34 | KOBE | MEAL | 880 JPY |
| 0002 | USER001 | 11/11/2014 12:16 | OSAKA | MEAL | 1080 JPY |
| 0003 | USER001 | 11/15/2014 18:49 | TOKYO | MEAL | 1240 JPY |
| 0004 | USER001 | 09/22/2014 08:34 | ODAWARA | TAXI | 2840 JPY |
| 0005 | USER001 | 11/08/2014 12:11 | TOKYO | MEAL | 985 JPY |
| 0006 | USER001 | 11/09/2014 | TOKYO | EXPRESS TRAIN | 13620 JPY |
| 0007 | USER001 | 11/14/2014 14:01 | KOBE | MEAL | 850 JPY |
| 0008 | USER001 | 11/11/2014 08:52 | OSAKA | TOBACCO | 710 JPY |
| 0009 | USER001 | 09/21/2014 | ODAWARA | HOTEL | 7800 JPY |
| 0010 | USER001 | 09/20/2014 08:41 | TOKYO | MEAL | 1150 JPY |
| 0011 | USER001 | 11/12/2014 | OSAKA | HOTEL | 16000 JPY |
| 0012 | USER001 | 11/14/2014 13:32 | UNKNOWN | TAXI | 1860 JPY |
| 0013 | USER001 | 11/05/2014 09:36 | TOKYO | MEAL | 790 JPY |
| 0014 | USER001 | 11/06/2014 | NAGOYA | HOTEL | 9000 JPY |
| 0015 | USER001 | 11/10/2014 15:17 | OSAKA | TAXI | 2350 JPY |

FIG. 11B

SORTED BY DATE INFORMATION

| ID | USER INFORMATION | DATE INFORMATION | LOCATION INFORMATION | ITEM INFORMATION | AMOUNT |
|---|---|---|---|---|---|
| 0010 | USER001 | 09/20/2014 08:41 | TOKYO | MEAL | 1150 JPY |
| 0009 | USER001 | 09/21/2014 | ODAWARA | HOTEL | 7800 JPY |
| 0004 | USER001 | 09/22/2014 08:34 | ODAWARA | TAXI | 2840 JPY |
| 0013 | USER001 | 11/05/2014 09:36 | TOKYO | MEAL | 790 JPY |
| 0014 | USER001 | 11/06/2014 | NAGOYA | HOTEL | 18000 JPY |
| 0005 | USER001 | 11/08/2014 12:11 | TOKYO | MEAL | 985 JPY |
| 0006 | USER001 | 11/09/2014 | TOKYO | EXPRESS TRAIN | 13620 JPY |
| 0015 | USER001 | 11/10/2014 15:17 | OSAKA | TAXI | 2350 JPY |
| 0008 | USER001 | 11/11/2014 08:52 | OSAKA | TOBACCO | 710 JPY |
| 0002 | USER001 | 11/11/2014 12:16 | OSAKA | MEAL | 1080 JPY |
| 0011 | USER001 | 11/12/2014 | OSAKA | HOTEL | 16000 JPY |
| 0001 | USER001 | 11/14/2014 09:34 | KOBE | MEAL | 880 JPY |
| 0012 | USER001 | 11/14/2014 13:32 | UNKNOWN | TAXI | 1860 JPY |
| 0007 | USER001 | 11/14/2014 14:01 | KOBE | MEAL | 850 JPY |
| 0003 | USER001 | 11/15/2014 18:49 | TOKYO | MEAL | 1240 JPY |

FIG. 12

| ID | USER INFORMATION | DATE INFORMATION | LOCATION INFORMATION | ITEM INFORMATION | AMOUNT | GROUP |
|---|---|---|---|---|---|---|
| 0010 | USER001 | 09/20/2014 08:41 | TOKYO | MEAL | 1150 JPY | |
| 0009 | USER001 | 09/21/2014 | ODAWARA | HOTEL | 7800 JPY | G4 (CONTINUOUS, LODGING) |
| 0004 | USER001 | 09/22/2014 08:34 | ODAWARA | TAXI | 2840 JPY | |
| 0013 | USER001 | 11/05/2014 09:36 | TOKYO | MEAL | 790 JPY | |
| 0014 | USER001 | 11/06/2014 | NAGOYA | HOTEL | 18000 JPY | G5 (CONTINUOUS, LODGING) |
| 0005 | USER001 | 11/08/2014 12:11 | TOKYO | MEAL | 985 JPY | |
| 0006 | USER001 | 11/09/2014 | TOKYO | EXPRESS TRAIN | 13620 JPY | |
| 0015 | USER001 | 11/10/2014 15:17 | OSAKA | TAXI | 2350 JPY | |
| 0008 | USER001 | 11/11/2014 08:52 | OSAKA | TOBACCO | 710 JPY | |
| 0002 | USER001 | 11/11/2014 12:16 | OSAKA | MEAL | 1080 JPY | G6 (CONTINUOUS, LODGING) |
| 0011 | USER001 | 11/12/2014 | OSAKA | HOTEL | 16000 JPY | |
| 0001 | USER001 | 11/14/2014 09:34 | KOBE | MEAL | 880 JPY | |
| 0012 | USER001 | 11/14/2014 13:32 | UNKNOWN | TAXI | 1860 JPY | |
| 0007 | USER001 | 11/14/2014 14:01 | KOBE | MEAL | 850 JPY | |
| 0003 | USER001 | 11/15/2014 18:49 | TOKYO | MEAL | 1240 JPY | |

FIG. 13

| ID | USER INFORMATION | DATE INFORMATION | LOCATION INFORMATION | ITEM INFORMATION | AMOUNT | GROUP |
|---|---|---|---|---|---|---|
| 0010 | USER001 | 09/20/2014 08:41 | TOKYO | MEAL | 1150 JPY | |
| 0009 | USER001 | 09/21/2014 | ODAWARA | HOTEL | 7800 JPY | G4 CONTINUOUS } LODGING |
| 0004 | USER001 | 09/22/2014 08:34 | ODAWARA | TAXI | 2840 JPY | |
| 0013 | USER001 | 11/05/2014 09:36 | TOKYO | MEAL | 790 JPY | |
| 0014 | USER001 | 11/06/2014 | NAGOYA | HOTEL | 18000 JPY | G5 CONTINUOUS } LODGING |
| 0005 | USER001 | 11/08/2014 12:11 | TOKYO | MEAL | 985 JPY | |
| 0006 | USER001 | 11/09/2014 | TOKYO | EXPRESS TRAIN | 13620 JPY | |
| 0015 | USER001 | 11/10/2014 15:17 | OSAKA | TAXI | 2350 JPY | G6 CONTINUOUS |
| ~~0008~~ | ~~USER001~~ | ~~11/11/2014 08:52~~ | ~~OSAKA~~ | ~~TOBACCO~~ | ~~710 JPY~~ | |
| 0002 | USER001 | 11/11/2014 12:16 | OSAKA | MEAL | 1080 JPY | |
| 0011 | USER001 | 11/12/2014 | OSAKA | HOTEL | 16000 JPY | CONTINUOUS } LODGING |
| 0001 | USER001 | 11/14/2014 09:34 | KOBE | MEAL | 880 JPY | |
| 0012 | USER001 | 11/14/2014 13:32 | KOBE | TAXI | 1860 JPY | |
| 0007 | USER001 | 11/14/2014 14:01 | KOBE | MEAL | 850 JPY | |
| 0003 | USER001 | 11/15/2014 18:49 | TOKYO | MEAL | 1240 JPY | |

ELIMINATE (ITEM)

FIG. 14

GROUP G4
ITINERARY 4:
09/20/2014 TOKYO
09/21/2014 ODAWARA (LODGING 2 NIGHTS)
09/23/2014 TOKYO
ROUTE: TOKYO > ODAWARA (> TOKYO)
TRAVEL EXPENSES
MEALS: 1150 JPY
TRANSPORTATION: 2840 JPY
LODGING: 13200 JPY
TOTAL: 17190 JPY

GROUP G5
ITINERARY 5:
11/05/2014 TOKYO
11/06/2014-11/07/2014 NAGOYA (LODGING 2 NIGHTS)
11/08/2014 TOKYO
ROUTE: TOKYO > NAGOYA > TOKYO
TRAVEL EXPENSES
MEALS: 1775 JPY
TRANSPORTATION: 0 JPY
LODGING: 18000 JPY
TOTAL: 19775 JPY

GROUP G6
ITINERARY 6:
11/09/2014 TOKYO
11/12/2014-11/13/2014 OSAKA (LODGING 2 NIGHTS)
11/14/2014 KOBE
11/15/2014 TOKYO
ROUTE: TOKYO > OSAKA > KOBE > TOKYO
TRAVEL EXPENSES
MEALS: 4050 JPY
TRANSPORTATION: 24270 JPY
LODGING: 16000 JPY
TOTAL: 44320 JPY

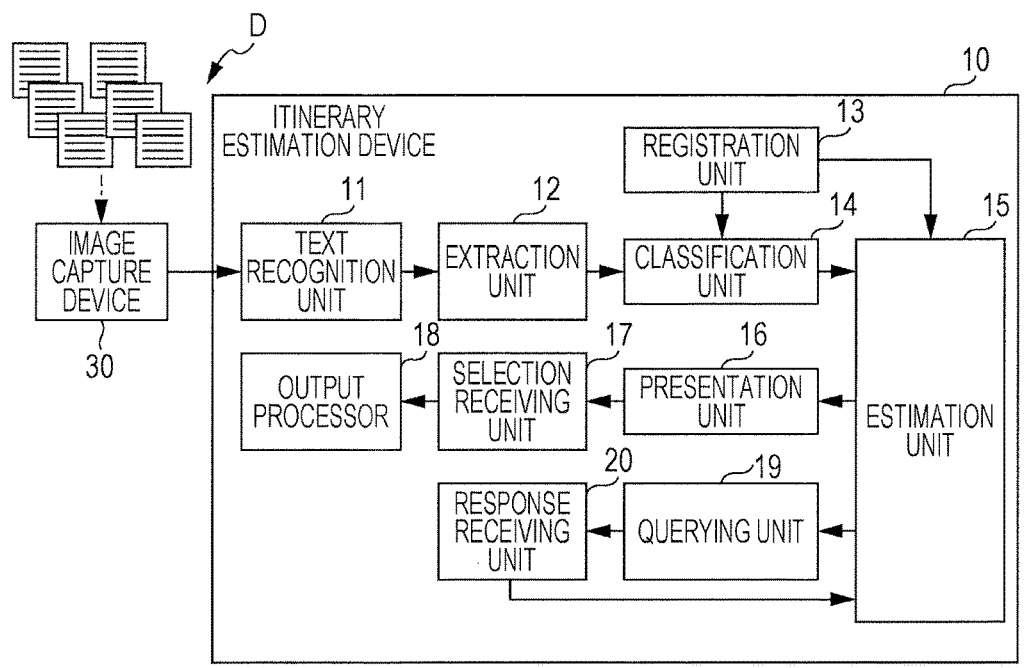

ITINERARY ESTIMATION DEVICE AND METHOD, NON-TRANSITORY COMPUTER-READABLE MEDIUM, AND INFORMATION CLASSIFICATION METHOD

CROSS-REFERENCE TO RELATED APPLICATIONS

This application is based on and claims priority under 35 USC 119 from Japanese Patent Application No. 2015-058239 filed Mar. 20, 2015.

BACKGROUND

Technical Field

The present invention relates to an itinerary estimation device and method, a non-transitory computer-readable medium, and an information classification method.

SUMMARY

According to an aspect of the invention, there is provided an itinerary estimation device that includes a classification unit and an estimation unit. The classification unit classifies multiple pieces of expense data including information related to expenses into one or more expense data groups, according to a chronological order of date information extracted from each of the multiple pieces of expense data. The estimation unit estimates an itinerary that includes at least dates on the basis of information including date information extracted from each piece of classified expense data included in the expense data group.

BRIEF DESCRIPTION OF THE DRAWINGS

Exemplary embodiments of the present invention will be described in detail based on the following figures, wherein:

FIGS. 1A to 1E are explanatory diagrams illustrating examples of documents handled by an exemplary embodiment of the present invention;

FIG. 5 is a flowchart illustrating a continuation of the process illustrated in FIG. 4, conducted by an itinerary estimation device according to the first exemplary embodiment;

FIGS. 6A and 6B are explanatory diagrams illustrating expense data according to the first exemplary embodiment;

FIG. 7 is an explanatory diagram illustrating a classification of expense data according to the first exemplary embodiment;

FIG. 8 is an explanatory diagram illustrating expense data after a correction process according to the first exemplary embodiment;

FIG. 9 is an explanatory diagram illustrating an itinerary output from an output processor according to the first exemplary embodiment;

FIGS. 11A and 11B are explanatory diagrams illustrating expense data according to the second exemplary embodiment;

FIG. 12 is an explanatory diagram illustrating a classification of expense data according to the second exemplary embodiment;

FIG. 13 is an explanatory diagram illustrating expense data after a correction process according to the second exemplary embodiment;

FIG. 14 is an explanatory diagram illustrating an itinerary output from an output processor according to the second exemplary embodiment;

FIG. 15 is a block diagram illustrating a functional configuration of an itinerary estimation device according to an exemplary modification 1 of the present invention;

FIG. 16 is an explanatory diagram illustrating a query conducted by an itinerary estimation device according to exemplary modification 1;

DETAILED DESCRIPTION

Figure 2:
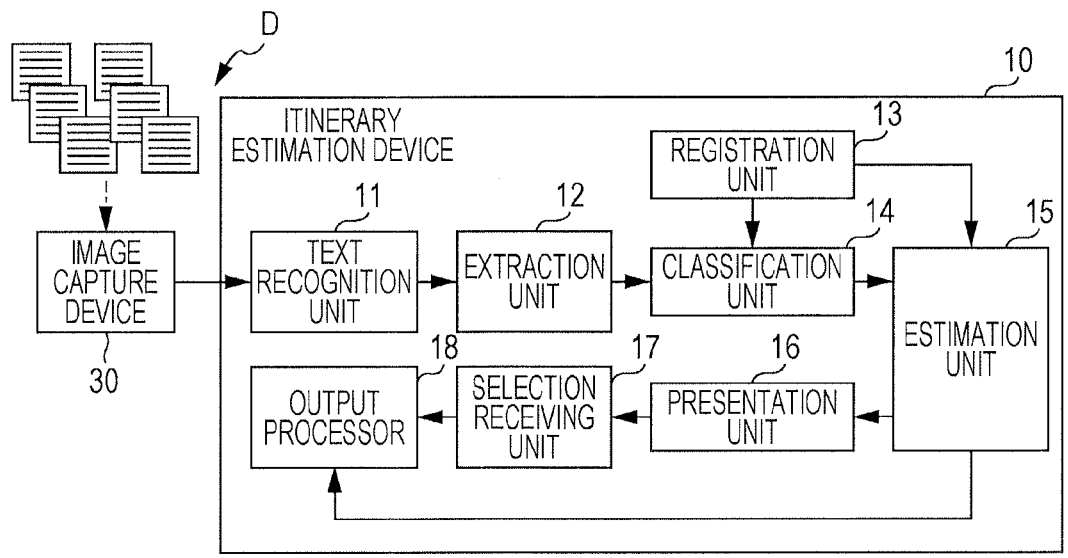
FIG. 2 is a block diagram illustrating a functional configuration of an itinerary estimation device according to a first exemplary embodiment of the present invention.

Actions performed by people may be tracked by a collection of multiple pieces of information having temporal and/or spatial continuity. For this reason, when information issued in conjunction with actions by a person is obtained at multiple times, it is possible to estimate that person's actions by analyzing the temporal and/or spatial continuity of the multiple pieces of information. Based on the inventor's knowledge as above, the present invention, on the basis of a continuity of date information extracted from each of multiple pieces of information issued independently, or a continuity of extracted location information at multiple times, classifies the multiple issued pieces of information into one or more information groups for estimating an action performed by people (for example, a single person), and estimates the actions. The actions may be a certain collection of actions by a person, or more specifically, a series of actions by a person.

Hereinafter, as an aspect of the present invention, a description will be given in which an itinerary is estimated on the basis of documents issued in conjunction with business transactions, particularly monetary or other expenses. Herein, an itinerary is a schedule of travel undertaken for purposes such as tourism, a business trip, or relocation (moving). A representative example of the above documents are receipts, which are used to prove that money was received, and which are issued by the receiver of the money.

A document related to expenses may state information about the date, location, expense item, and monetary amount, for example. The date stated in a document indicates, for example, the day on which a business transaction occurred (issue date of the document), or the day on which a product or service (labor) was provided. The location stated in a document indicates, for example, the location where a business transaction occurred, or the location where a product or service was provided. The expense item indicates the item of expenditure. The monetary amount indicates the monetary amount of expenditure. A document related to expenses may state all of the above information in some cases, and state only some of the above information in other cases.

FIGS. 1A to 1E are diagrams illustrating examples of documents handled by an exemplary embodiment of the present invention.

FIG. 1A illustrates a document D1 indicating a receipt. The document D1 illustrates a receipt issued by "Hamburger Shop AAA". The document D1 states "2/15/2015" as the date, "1:44 μm." as the time, " . . . , Ginza, Chuo-ku, Tokyo" as the location, "Hamburger" and "Drink" as the expense items, and "¥400" as the monetary amount.

Note that the information specifying the location is not limited to an address, and information such as the "Ginza" part of the name of the shop stated in document D1 and the area code "03" included in the phone number "03-1111-XXXX" may also correspond to information specifying the location.

FIG. 1B illustrates a document D2 indicating a receipt. The document D2 is issued by being handwritten, rather than being electronically processed like the document D1. The document D2 states "2/16/2015" as the date, " . . . , Osaka, Osaka Prefecture" as the location, "Computer software" as the expense item, and "¥25600" as the monetary amount. In this way, the information related to expenses discussed earlier may also be stated in a document that is issued by being handwritten.

FIG. 1C illustrates a document D3 illustrating a receipt from a lodging facility. The document D3 states "2/21/15" as the date, " . . . , Hakata-ku, Fukuoka" and "Hakata" as the location, "Lodging charge" as the expense item, and "6200" as the monetary amount. The document D3 additionally states a check-in date of "2.17.15" and a check-out date of "2.21.15" as dates specifying the period of stay. In other words, the document D3 states information indicating that the period from Feb. 17, 2015 to Feb. 21, 2015 was a lodging period.

The documents related to expenses also include documents other than documents use to prove that money was received. The documents may also be documents related to a product or service which are provided in exchange for the payment of money, for example. This kind of document includes tickets for means of transportation, and tickets for events such as sports events and concerts. FIG. 1D illustrates a document D4 illustrating a ticket for a limited express train. The document D4 states "Feb. 15" as the boarding date, "6:00" and "8:30" as the departure and arrival times, "Tokyo" and "Shin-Osaka" as the departure and arrival locations, "Limited Express" as the expense item, and "¥13000" as the monetary amount.

Documents related to expenses also include documents issued by someone other than the receiver of money. Such documents include statements issued by a credit card company, bank, or the like, for example. FIG. 1E illustrates a document D5 illustrating a credit card statement. The document D5 states the information "2.21.15" as the date, "Tokyo" as the location, "Restaurant AAA Tokyo" as the expense item, and "¥5000" as the monetary amount.

As above, there are various kinds of documents related to expenses. A document related to expenses is not related to the documents given above, insofar as the document states information related to expenses. Each of such documents is issued in conjunction with one or multiple business transactions, independently of other documents related to expenses.

Next, an exemplary embodiment of an itinerary estimation device that estimates an itinerary on the basis of information obtained from documents related to expenses will be described. The itinerary estimation device is used for the purpose of a user working at a corporation to settle business trip expenses with the corporation, for example. In other words, at corporations, a business expenses management system is ordinarily introduced to manage business expenses such as employee business trip expenses, but such a system may involve a user (employee) applying for reimbursement by registering in the system a schedule of a business trip, and an expense report of expenses related to the business trip. The itinerary estimation device according to an exemplary embodiment of the present invention may be used in such situations. Besides the above, the itinerary estimation device may also be used for the purpose of managing the itinerary of a personal trip undertaken by a user, and may also be used for various other applications.

First Exemplary Embodiment

FIG. 2 is a block diagram illustrating a functional configuration of an itinerary estimation device 10 according to a first exemplary embodiment of the present invention. The itinerary estimation device 10 is communicably connected to an image capture device 30. The image capture device 30 captures an image of each document included in a document group D. The image capture device 30 may be any device having an image capture function, such as a scanner, a digital camera, and various communication terminal devices typified by smartphones. In this case, the itinerary estimation device 10 is realized by an information processing device such as a personal computer used by an individual user, or by a server device shared among multiple users.

Note that although the image capture device 30 is a device separately provided from the itinerary estimation device 10, the functions of the image capture device 30 may also be built into the itinerary estimation device 10. In this case, the itinerary estimation device 10 may also be realized by an image forming device equipped with an image capture function (for example, a scan function), as well as multiple other functions such as a copy function, a printer function, and a facsimile transmission function, for example.

The itinerary estimation device 10 is equipped with a text recognition unit 11, an extraction unit 12, a registration unit 13, a classification unit 14, an estimation unit 15, a presentation unit 16, a selection receiving unit 17, and an output processor 18.

The text recognition unit 11 recognizes text included in an image captured by the image capture device 30. The text recognition unit 11 conducts an optical character recognition process (hereinafter called an "OCR process") on the basis of an image obtained by capturing an image of each document included in the document group D, and generates character codes (such as ASCII, Unicode, or Shift_JIS, for example).

The extraction unit 12 extracts expense data, which is data including information related to expenses, on the basis of the text (character codes) recognized by the text recognition unit 11. Herein, expense data includes date information corresponding to a date stated in a document, location information corresponding to a location, expense item information corresponding to an expense item, and information about a monetary amount. In some cases, just one piece of expense data is obtained from one document, whereas in other cases, multiple pieces of expense data are obtained from one document, like the statement described using FIG. 1E.

The registration unit 13 registers a location that is potentially the start point or the end point of an itinerary. Herein, the start point and the end point of an itinerary is the location that serves as the base of the user's movements (in other words, the hometown). The hometown may be the user's home or place of work, or a train station often used by the user (for example, the closest train station to the user's home or place of work). Location information indicating a hometown registered by the registration unit 13 is hereinafter designated "hometown information". Hometown information is an example of registered location information according to an exemplary embodiment of the present invention. Hometown information is desirably expressed as a character string indicating a location that may be stated in a document, such as a place name or a station name.

The registration unit 13 registers a hometown specified by the user, for example. Also, one hometown, or two or more hometowns, may be registered for a single user.

The classification unit 14 classifies multiple pieces of expense data into one or more expense data groups, according to the chronological order of date information extracted from each of the multiple pieces of expense data by the extraction unit 12. Expense data groups are hereinafter designated "groups". In the present exemplary embodiment, the classification unit 14 conducts a classification that categorizes expense data into different groups by using expense data from which hometown information was extracted as group boundaries.

The estimation unit 15 specifies each piece of expense data included in each group generated by the classification unit 14, and estimates an itinerary on the basis of information such as date information extracted from each piece of expense data. The estimation unit 15 at least estimates an itinerary that includes dates corresponding to the extracted date information. In the present exemplary embodiment, the estimation unit 15 estimates one itinerary unit on the basis of information including date information extracted from each piece of expense data included in one group. Herein, one itinerary unit refers to the schedule of one trip that starts from a start point location and ends at an end point location.

When multiple itineraries are estimated on the basis of one group by the estimation unit 15, the presentation unit 16 presents the multiple itineraries to the user.

The selection receiving unit 17 receives the selection by the user of one of the multiple itineraries presented by the presentation unit 16.

The output processor 18 conducts a process of outputting itinerary information on the basis of an itinerary estimated by the estimation unit 15 or a selection received by the selection receiving unit 17. The specific content of the output process is not particularly limited, and may include, for example, one or more from among processes for transmitting or recording (saving) itinerary data, and displaying or printing an image indicating an itinerary.

Figure 3:
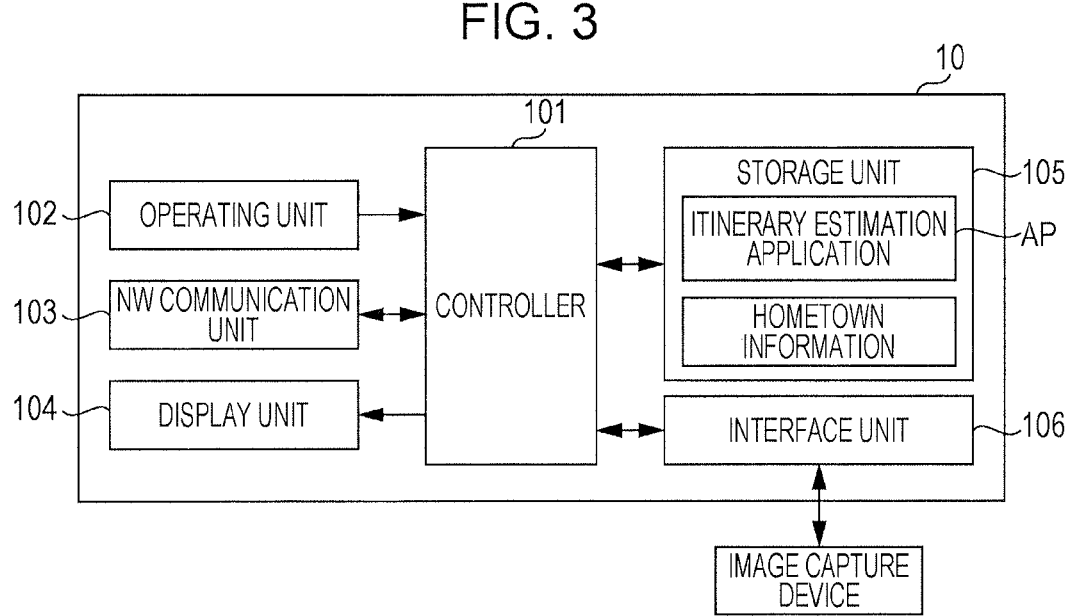
FIG. 3 is a block diagram illustrating a hardware configuration of an itinerary estimation device according to the first exemplary embodiment.

FIG. 3 is a block diagram illustrating a hardware configuration of the itinerary estimation device 10. As illustrated in FIG. 3, the itinerary estimation device 10 is equipped with a controller 101, an operating unit 102, a NW communication unit 103, a display unit 104, a storage unit 105, and an interface unit 106.

The controller 101 includes a central processing unit (CPU) as a computational processing device, read-only memory (ROM), and random access memory (RAM) as a work area, and controls the components of the itinerary estimation device 10. The CPU loads a program stored in the ROM or the storage unit 105 into RAM, and executes the program.

The operating unit 102 is equipped with a keyboard and mouse, for example, and is operated by the user. The NW communication unit 103 is equipped with a modem, for example, and communicates by connecting to a network such as the Internet. The display unit 104 is equipped with a liquid crystal display, for example, and displays various images (screens). The storage unit 105 is equipped with a hard disk, for example, and stores various data. For example, the storage unit 105 stores an operating system (OS), an itinerary estimation application AP for realizing the functions of the itinerary estimation device 10 described using FIG. 2, and registered hometown information. The interface unit 106 is equipped with a connector for connecting a cable, for example, and is connected to the image capture device 30 via the cable.

The text recognition unit 11, the extraction unit 12, the registration unit 13, the classification unit 14, and the estimation unit 15 described using FIG. 2 are realized by the controller 101, for example. The presentation unit 16 is realized by the controller 101 and the display unit 104, for example. The selection receiving unit 17 is realized by the controller 101 and the operating unit 102, for example. The output processor 18 is realized by the controller 101, the NW communication unit 103, and the display unit 104, for example.

Figure 4:
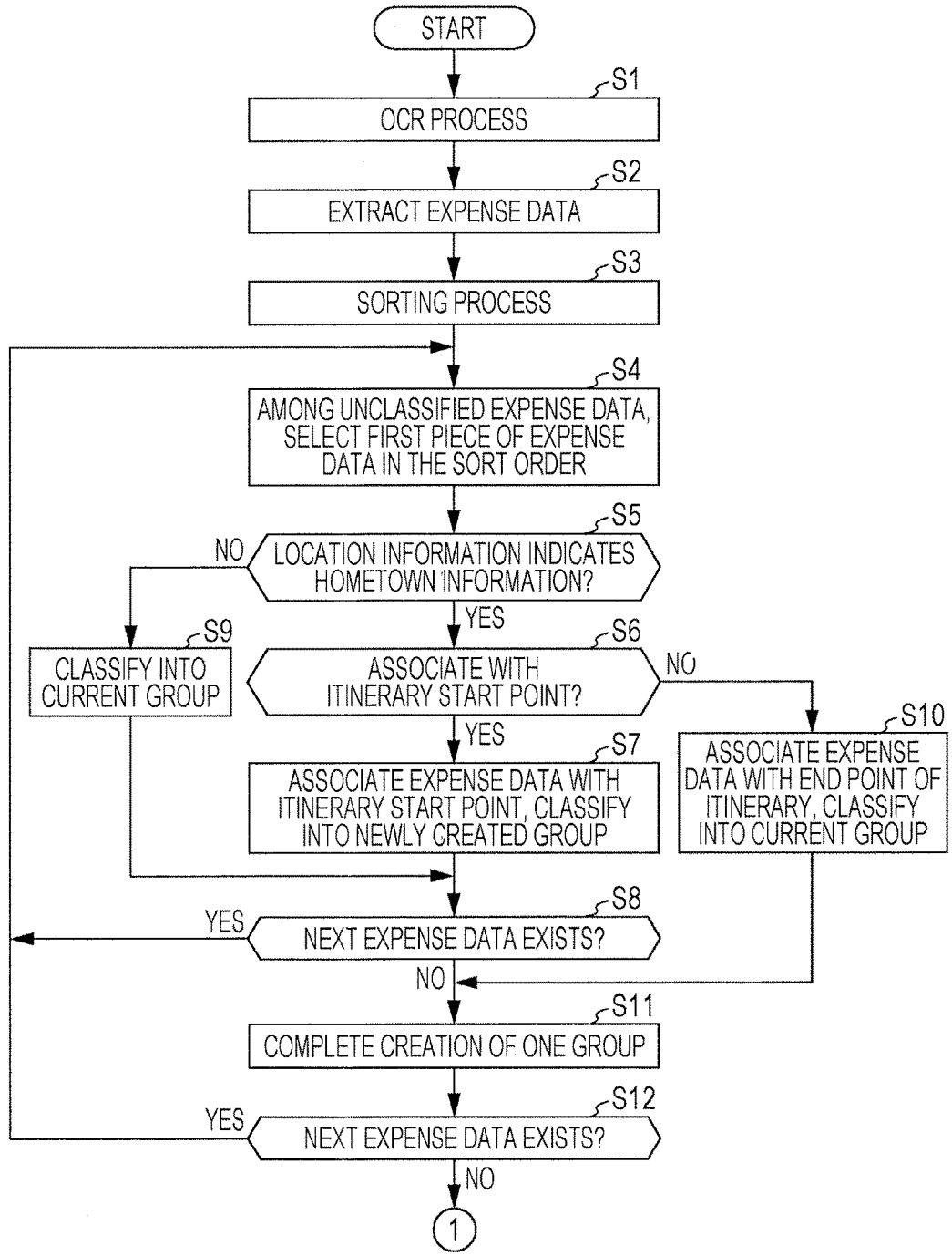
FIG. 4 is a flowchart illustrating a process for estimating an itinerary, conducted by an itinerary estimation device according to the first exemplary embodiment.

FIGS. 4 and 5 are flowcharts illustrating a process for estimating an itinerary, conducted by the itinerary estimation device 10. FIGS. 6A and 6B are diagrams explaining expense data. Prior to the process described hereinafter, the registration unit 13 registers hometown information in advance. Herein, the place name "Tokyo", and the station names "Tokyo Station" and "Shinagawa Station" are registered as hometown information.

After an image of each document in the document group D is captured by the image capture device 30, the text recognition unit 11 conducts an OCR process on the basis of the captured images (step S1). The OCR process may be conducted in parallel with the document image capture, or be conducted after image capture finishes.

After the OCR process is conducted, the extraction unit 12 extracts expense data on the basis of text recognized from the images (step S2). FIG. 6A illustrates multiple pieces of expense data extracted in step S2. Herein, each piece of expense data includes the information of an "ID" that uniquely identifies that piece of expense data, "user information" that uniquely identifies a user, "date information", "location information", "expense item information", and a "monetary amount". The value of the ID is assigned in ascending order in the order in which the expense data is generated, or in other words, in the order in which documents are imaged by the image capture device 30. Herein, the user information is "USER001", which identifies the same user. The date information includes information indicating at least a date stated in a document, but in some cases may additionally include information indicating a time stated in the document.

Herein, the location information is information indicating a place name. In cases where directly specifying a place name from information stated in a document is difficult, a configuration may be adopted in which a separately provided server (not illustrated) is used to infer a place name from separate information, such as a phone number or a shop name.

Note that in FIG. 6A, the location information of the expense data with the ID "0012" is "Unknown". Possible causes of this result are that information indicating a location is not stated in the document, or an extraction failure occurred.

Herein, the expense item information is information such as "Meal", in which the expense item stated in a document is expressed as a more general conceptual category, but the expense item information may also be expressed as more specific conceptual categories (subdivision). For example, the expense item information may be subdivided into "Breakfast", "Lunch", and "Dinner" according to time information included in the date information or the relative size of the monetary amount. In addition, expense item information may also be subdivided according to the content of a meal, such as "Chinese food" or "Italian food".

The classification unit 14 conducts a sorting process that sorts the expense data extracted in step S2 according to the chronological order of the date information (step S3). In the sorting process, expense data is sorted in order of earliest date information. FIG. 6B illustrates the result of the sorting process on the multiple pieces of expense data described using FIG. 6A. At this stage, the expense data is sorted according to the chronological order of the date information, but is still a single lump of data. Note that during the sorting process, when there are multiple pieces of expense data with the same date information, the order of the time of day is also taken into account. When time information is not extracted, the time may be taken to be a specific time (for example, 0:00), or an appropriate time may be estimated by referencing the expense item information or the like. In the latter case, if the expense item information is "Dinner", the time may be estimated to be "19:00", for example.

Next, the classification unit 14 starts a process of classifying each piece of expense data among the multiple pieces of expense data into groups.

First, the classification unit 14 selects, from among the expense data that has not been classified into a group, the first piece of expense data in the sort order as the current piece of expense data to process (step S4). Herein, the classification unit 14 selects the expense data with the ID "0010" as the current piece of expense data to process.

Next, the classification unit 14 determines whether or not the location information extracted from the current expense data indicates hometown information (step S5). As illustrated in FIG. 6B, "Tokyo" is extracted as the location information from the expense data with the ID "0010". Consequently, the classification unit 14 determines "Yes" in step S5. Next, the classification unit 14 determines whether or not to associate the extracted location information with the start point of a trip (step S6). The classification unit 14 makes the determination in step S6 on the basis of the determination conditions (C11) to (C13) described below.

(C11) Among expense data from which hometown information was extracted, associate odd-numbered expense data in the sort order with the start point, and even-numbered expense data in the sort order with the end point.

(C12) Among expense data from which hometown information was extracted, and for which the hometown information is included in two or more pieces of expense data whose extracted date information exists in a continuous relationship, associate the first piece of expense data in the sort order with the start point, and the last piece of expense data in the sort order with the end point.

(C13) If hometown information is extracted from each of two or more pieces of expense data whose extracted date information exists in a continuous relationship, associate the earlier piece of expense data in the sort order with the end point of one itinerary unit, and the later piece of expense data in the sort order with the start point of another itinerary unit.

The reason for implementing the determination condition (C11) is as follows. Suppose that when the user starts a trip with the hometown as the start point, and ends the trip with the hometown as the end point, there exist documents related to expenses issued at the start time and the end time of the trip. In this case, when processing a piece of expense data from which hometown information was extracted, it is estimated that expense data corresponding to the start point of the itinerary and expense data corresponding to the end point of the itinerary are likely to appear in alternation.

The reason for implementing the determination condition (C12) is as follows. When there exist two or more pieces of expense data having date information in a continuous relationship, it is estimated that these pieces of expense data are related to one itinerary unit. For this reason, it is estimated that the piece of expense data from which hometown information was extracted and which has the earliest date information likely corresponds to the start point, while the piece of expense data from which hometown information was extracted and which has the latest date information likely corresponds to the end point. As used herein, a continuous relationship of date information includes a relationship in which the dates indicated by the date information are continuous in chronological order (in other words, the dates differ by one day), but also includes a relationship in which the dates indicated by the date information are the same in chronological order (in other words, the dates indicate the same day).

The reason for implementing the determination condition (C13) is as follows. When hometown information is extracted from each of two pieces of expense data whose date information exists in a continuous relationship, since separate expense data does not exist between the two pieces of expense data, it is unlikely that these pieces of expense data are related to the same itinerary. Consequently, the two pieces of expense data are estimated to be expense data related to mutually different itineraries. For this reason, it is estimated that the piece of expense data with the earlier date information likely corresponds to the end point of one itinerary unit, while the piece of expense data with the later date information likely corresponds to the start point of another itinerary unit. The determination condition (C13) tends to be satisfied when the user returns to the hometown at the end of a trip, and then immediately starts the next trip.

In step S6, when a duplicate determination result is returned by two or more of the determination conditions (C11) to (C13), for example, the classification unit 14 treats that determination result as the final determination result. Otherwise, the classification unit 14 may also compute a final determination result by relatively increasing the weighting given to a specific determination condition (such as the determination condition (C12), for example).

In the case of the expense data with the ID "0010", the classification unit 14 determines to associate the piece of expense data with the start point of an itinerary, on the basis of at least the determination conditions (C11) and (C12) (step S6; Yes).

If "Yes" is determined in step S6, the classification unit 14 associates the expense data with the start point of an itinerary, and classifies the expense data into a newly created group (step S7). FIG. 7 is a diagram explaining the classification of expense data. As illustrated in FIG. 7, the classification unit 14 classifies the expense data with the ID "0010" into a group G1.

Note that in the field labeled "Hometown" in FIG. 7, "Start point" is entered for expense data corresponding to a start point of an itinerary, "End point" is entered for expense data corresponding to an end point, and "-" (hyphen) is entered for expense data corresponding to neither a start point nor an end point.

Next, the classification unit 14 determines whether or not a next piece of expense data exists in the sort order (step S8). Herein, "Yes" is determined in step S8, and the classification unit 14 returns to the process in step S4. Subsequently, the classification unit 14 selects, from among the expense data that has not been classified into a group, the first piece of expense data in the sort order as the current piece of expense data to process (step S4). Herein, the classification unit 14 selects the expense data with the ID "0009" as the current piece of expense data to process.

Next, the classification unit 14 determines whether or not the location information extracted from the current expense data indicates hometown information (step S5). As illustrated in FIG. 6B, "Odawara" is extracted as the location information from the expense data with the ID "0009". Consequently, the classification unit 14 determines "No" in step S5. If "No" is determined in step S5, the classification unit 14 adds the expense data to the group currently being created (step S9). As illustrated in FIG. 7, the classification unit 14 classifies the expense data with the ID "0009" into the group G1.

Subsequently, the classification unit 14 proceeds to the process in step S8, and determines whether or not a next piece of expense data exists in the sort order. In the next step S4, the classification unit 14 selects the expense data with the ID "0004" as the current piece of expense data to process.

"Tokyo" is extracted as the location information from the expense data with the ID "0004". Consequently, the classification unit 14 determines "Yes" in step S5. Subsequently, the classification unit 14 determines whether or not to associate the extracted location information with the start point of a trip (step S6). Herein, the classification unit 14 determines to associate the expense data with the end point of an itinerary, on the basis of at least the determination conditions (C11) and (C12). Consequently, the classification unit 14 determines "No" in step S6, associates the expense data with the end point of the itinerary, and classifies the expense data into the group currently being created (step S10). As illustrated in FIG. 7, the classification unit 14 classifies the expense data with the ID "0004" into the group G1. Subsequently, the classification unit 14 completes the creation of one group (step S11). Herein, the expense data classified into the group G1 is finalized.

Next, the classification unit 14 determines whether or not a next piece of expense data exists in the sort order (step S12). The classification unit 14 determines "Yes" at this point, and returns to the process in step S4. Thereafter, the classification unit 14 classifies all pieces of expense data into a group by repeating the process in steps S4 to S12.

As illustrated in FIG. 7, the classification unit 14 classifies the expense data with the IDs "0013", "0014", and "0005" into a group G2. In addition, on the basis of the determination conditions (C11) and (C13), the classification unit 14 associates the expense data having the ID "0013" with the start point of an itinerary, and associates the expense data having the ID "0005" with the end point of an itinerary. Furthermore, the classification unit 14 groups the expense data with the IDs "0006", "0015", "0008", "0002", "0001", "0011", "0012", "0007", and "0003" into a group G3. In addition, the classification unit 14 associates the expense data having the ID "0006" with the start point of an itinerary, and associates the expense data having the ID "0003" with the end point of an itinerary.

As illustrated in FIG. 7, in this case, expense data from which hometown was extracted corresponds to the start point or the end point in each of the groups G1 to G3, but this does not occur in some cases. After classifying expense data in step S7 or S9, if the classification unit 14 determines that a next piece of expense data does not exist in the sort order (step S8; No), the classification unit 14 completes the creation of the group at that point. In this case, the classification unit 14 associates the piece of expense data classified in the immediately previous step S7 or S9 with the end point of an itinerary. For example, when the user relocates to a location other than the hometown, that location becomes the end point of an itinerary.

Also, if expense data from which hometown information was extracted and which is to be associated with the start point of an itinerary does not exist, the classification unit 14 associates the first piece of expense data in the sort order that is not yet classified into a group with the start point of an itinerary.

As above, after the classification of expense data by the classification unit 14 ends, the estimation unit 15 estimates one itinerary unit for each group (step S13 in FIG. 5). Each group generated by the classification unit 14 is made up of expense data, but is merely a set of expense data having certain properties in common. The estimation unit 15 analyzes the content of the expense data included in each group, and thereby estimates the actions of a person (user) substantiated by the pieces of expense data, or in other words, estimates an itinerary. The estimation unit 15 according to the present exemplary embodiment analyzes the expense data included in each group, and thereby estimates where the user was located on certain dates, where the user went from place to place, and what kinds of expenses the user incurred on each day, for example. Consequently, the estimated itinerary includes information about the actions of the person on the trip, such as the locations where the user was present on associated dates, a route of movement among multiple locations, the means of transportation used for such movement, the places where the user stayed overnight, and travel expenses.

The estimation unit 15 estimates an itinerary on the basis of a route of movement estimated from the geographical relationships among multiple pieces of location information extracted from each piece of expense data in one group. This movement route estimation takes into account the continuity of location information at multiple times. For example, when two pieces of expense data including the same date information exist, and one piece of location information indicates "Tokyo" while the other piece of location information indicates "Osaka", the estimation unit 15 estimates that movement between "Tokyo" and "Osaka" occurred on the day indicated by the relevant date information. When three pieces of expense data including the same date information exist, and location information indicating "Tokyo", "Osaka", and "Fukuoka" is extracted from each, the estimation unit 15 estimates, on the basis of the continuity of the geographical positions of these three pieces of location information, movement on a route of "Tokyo"→"Osaka"→"Fukuoka", or movement on a route of "Fukuoka"→"Osaka"→"Tokyo". When information about the time stayed in each location is obtained, like the document D4 described in FIG. 1D, the estimation unit 15 estimates a movement route on the basis of the time information.

Regarding travel expenses, the estimation unit 15 computes travel expenses for respective categories specified from the expense item information, such as meal expenses, transportation expenses, and lodging expenses, for example. However, these categories are merely one example, and may be subdivided further, for example.

Next, the estimation unit 15 conducts a correction process of correcting each piece of expense data among the multiple pieces of expense data. The correction process according to the present exemplary embodiment includes an elimination process, an amendment process, and a supplementation process. The elimination process is a process of eliminating expense data not used for itinerary estimation. The amendment process is a process of amending information (text) containing errors caused by text recognition during the OCR process. The supplementation process is a process of supplementing information that was not extracted from the expense data. FIG. 8 is a diagram explaining expense data after the correction process.

First, the estimation unit 15 conducts the elimination process (step S14). The algorithm of the elimination process is predetermined, and in the present exemplary embodiment, is conducted on the basis of the following elimination conditions (C21) and (C22).

(C21) Eliminate expense data from which some location information was extracted, on the basis of the geographical relationships among multiple pieces of location information extracted from each piece of expense data included in one group.

(C22) Eliminate expense data not used for itinerary estimation, on the basis of expense item information extracted from expense data.

The elimination process based on the elimination condition (C21) is a process for eliminating expense data from which was extracted location information indicating a location of unlikely movement given the geographical relationships among the multiple pieces of location information. For example, the location information of the expense data with the ID "0001" illustrated in FIG. 7 is "Fukuoka", but the location information of most other expense data included in the same group G3 indicates "Osaka" or "Kobe", which are somewhat distant from Fukuoka. For this reason, it is estimated that the expense data with the ID "0001" is not expense data related to the itinerary estimated from the group G3. Consequently, the estimation unit 15 eliminates the piece of expense data with the ID "0001", as illustrated in FIG. 8. For example, this elimination process is conducted when a document issued to another person gets mixed into the expense data.

The elimination process based on the elimination condition (C22) is a process for not including the monetary amount of an expense item not considered to be a travel expense with the rest of the travel expenses. For example, when the itinerary estimation device 10 is used for the purpose of reimbursing business trip expenses, in some cases expense items related to luxury goods such as tobacco may not be included in the travel expenses. Accordingly, the estimation unit 15 eliminates expense data from which specific expense item information is extracted.

Next, the estimation unit 15 conducts the amendment process (step S15). The algorithm of the amendment process is predetermined, and in the present exemplary embodiment, is conducted on the basis of the following amendment condition (C31).

(C31) Amend location information extracted from one piece of expense data on the basis of location information extracted from other expense data included in the same group.

As illustrated in FIG. 7, "Osuka" is the location information extracted from the expense data with the ID "0008". However, the same group G3 includes the expense data with the IDs "0015" and "0002" as expense data from which "Osaka" was extracted as location information. The estimation unit 15 conducts the amendment process when the same location information is extracted from two or more other pieces of expense data in the same group. Consequently, the estimation unit 15 amends the location information extracted from the expense data with the ID "0008" from "Osuka" to "Osaka", as illustrated in FIG. 8.

Hypothetically, if expense data with the location information "Osaka" is not included in the group G3, the estimation unit 15 does not amend "Osuka" to "Osaka". The reason for this is because there is a possibility that the user actually visited a location called "Osuka", or that information not denoting a location, such as the name of a shop, was recognized as the location information.

Next, the estimation unit 15 conducts the supplementation process. The algorithm of the supplementation process is predetermined, and in the present exemplary embodiment, is conducted on the basis of the following supplementation condition (C41).

(C41) Supplement location information not extracted from one piece of expense data on the basis of location information extracted from other expense data classified into the same group.

As illustrated in FIG. 7, the location information of the expense data with the ID "0012" is "Unknown". However, "Kobe" is extracted as the location information from the expense data with the IDs "0011" and "0007" in the same group G3, which are adjacent in the sort order to the expense data with the ID "0012". In this case, the estimation unit 15 supplements "Kobe" as the location information of the expense data with the ID "0012", as illustrated in FIG. 8. In this way, when the adjacent location information matches before and after a piece of expense data in the sort order, a supplementation process of supplementing the relevant piece of expense data with the matching location information is conducted. When the adjacent location information is different, the estimation unit 15 may supplement the relevant piece of expense data with the location information of the expense data with the closer date information.

Note that the order in which the elimination process, the amendment process, and the supplementation process are executed may also be changed.

Next, the estimation unit 15 determines whether or not a group with multiple estimated itineraries exists (step S17). When one itinerary is estimated for one group, the estimation unit 15 determines "No" in step S17. In this case, the output processor 18 finalizes the itinerary after the correction process, and conducts an output process of outputting the data of that itinerary (step S20).

FIG. 9 is a diagram explaining an itinerary output from the output processor 18.

As illustrated in FIG. 9, the "Itinerary 1" estimated from the group G1 includes information indicating that the user was present in Tokyo on Sep. 20, 2014, was present and stayed overnight in Odawara on Sep. 21, 2014, and was present in Tokyo on Sep. 22, 2014. The "Route" information herein is "Tokyo"→"Odawara"→"Tokyo". "Travel Expenses" includes the information of meal expenses of "1150JPY" corresponding to the "Meal" expense item, transportation expenses of "2840JPY" corresponding to the "Taxi" expense item, lodging expenses of "7800JPY" corresponding to the "Hotel" expense item, and the total of the above, "11790JPY". The "Itinerary 2" estimated from the group G2 and the "Itinerary 3" estimated from the group G3 also include information about the user's actions on trips.

Note that the itinerary information described using FIG. 9 is merely one example. For example, on the basis of time information included in the date information, a more detailed itinerary may be estimated to indicate not only where the user was located on certain dates, but also where the user was located at certain times of day. In addition, some of the information described using FIG. 9 may also be omitted. For example, expense amounts are relevant to processing business expenses, but in the case of simply wanting to gain a rough grasp of an itinerary, an itinerary indicating only the dates and the route of movement is also conceivable. Furthermore, the itinerary information is not limited to being expressed as text information, and may also be expressed by a combination of image information (a map, for example), audio information, and other human- or computer-readable information, for example.

In step S17, when the estimation unit 15 determines that a group with multiple estimated itineraries exists (step S17; No), the presentation unit 16 presents the multiple estimated itineraries (step S18). The selection receiving unit 17 receives a selection of one from among the multiple presented itineraries (step S19). The output processor 18 conducts an output process of outputting information about the selected itinerary (step S20).

At this point, consider a case in which, from the perspective of the expense data with the ID "0012" in the group G3, the location information of the previous piece of expense data in the sort order is "Kobe" while the location information of the next piece of expense data is "Osaka", and in addition, the date information is equally distant in time. In this case, the location information to be supplemented becomes two possibilities: "Kobe" and "Osaka". Accordingly, the estimation unit 15 estimates and presents two possible itineraries: one for the case of conducting the supplementation process using the location information "Kobe", and one for the case of conducting the supplementation process using the location information "Osaka". The user selects the true itinerary (that is, the itinerary corresponding to the truth) from among the two presented itineraries. The output processor 18 finalizes the selected itinerary, and conducts an output process of outputting information about the relevant itinerary.

Consequently, the itinerary estimation device 10 more easily outputs information about the true itinerary. The user burden related to itinerary selection increases, but the accuracy of itinerary estimation is improved.

The itinerary estimation device 10 also executes the processing steps S18 to S20 in the case of estimating multiple itineraries, irrespective of the supplementation process.

The above thus describes a case of the itinerary estimation device 10 estimating a Japanese domestic itinerary on the basis of expense data according to documents issued in the Japanese language, but the itinerary estimation device 10 may also estimate itineraries including international travel on the basis of expense data according to documents issued in a language other than Japanese.

According to the itinerary estimation device 10 in accordance with the first exemplary embodiment as described above, on the basis of a chronological order of date information extracted from each of multiple pieces of expense data, the multiple pieces of expense data may be classified into groups, and one itinerary unit may be estimated from each group. For this reason, the burden of inputting itinerary information into a computing device from scratch is not imposed on the user. Furthermore, even if the user has a large number of documents related to expenses at hand, the user does not have to determine whether or not each document is a document related to an itinerary, or keep track of the order of dates when imaging the documents. For example, even if the user keeps many receipts in disorder in his or her wallet, the user may simply place all of the receipts and the like kept in the wallet all at once into the input of the itinerary estimation device 10 according to the present exemplary embodiment, without determining whether or not each receipt relates to the itinerary. In so doing, documents unrelated to the itinerary are automatically eliminated by the elimination process, and an estimated itinerary is output. Consequently, for the user, an increase in the number of steps taken to obtain itinerary information is moderated. Furthermore, according to the itinerary estimation device 10, expense data from which hometown was extracted is used as a clue to estimate the start point or the end point of the itinerary, and thus one itinerary unit may be estimated accurately. In addition, the accuracy of estimating the true itinerary is also increased by a correction process that includes an elimination process, an amendment process, and a supplementation process.

Second Exemplary Embodiment

Next, a second exemplary embodiment of the present invention will be described. In the itinerary estimation device 10 according to the present exemplary embodiment, the configuration related to the classification of expense data into groups is different from the foregoing first exemplary embodiment. The function configuration of the itinerary estimation device 10 is roughly the same as the configuration illustrated in FIG. 2, but the classification unit 14 classifies two or pieces of expense data for which the extracted date information exists in a continuous relationship into the same group. In the present exemplary embodiment, the functions corresponding to the registration unit 13 may also be omitted. The hardware configuration of the itinerary estimation device 10 is the same as the configuration illustrated in FIG. 3. In the present exemplary embodiment, a structural element denoted with the same sign as in the foregoing first exemplary embodiment represents the same structural element as in the foregoing first exemplary embodiment.

Hereinafter, a process related to itinerary estimation conducted by the itinerary estimation device 10 will be described mostly in terms of the differences from the foregoing first exemplary embodiment.

Figure 10:
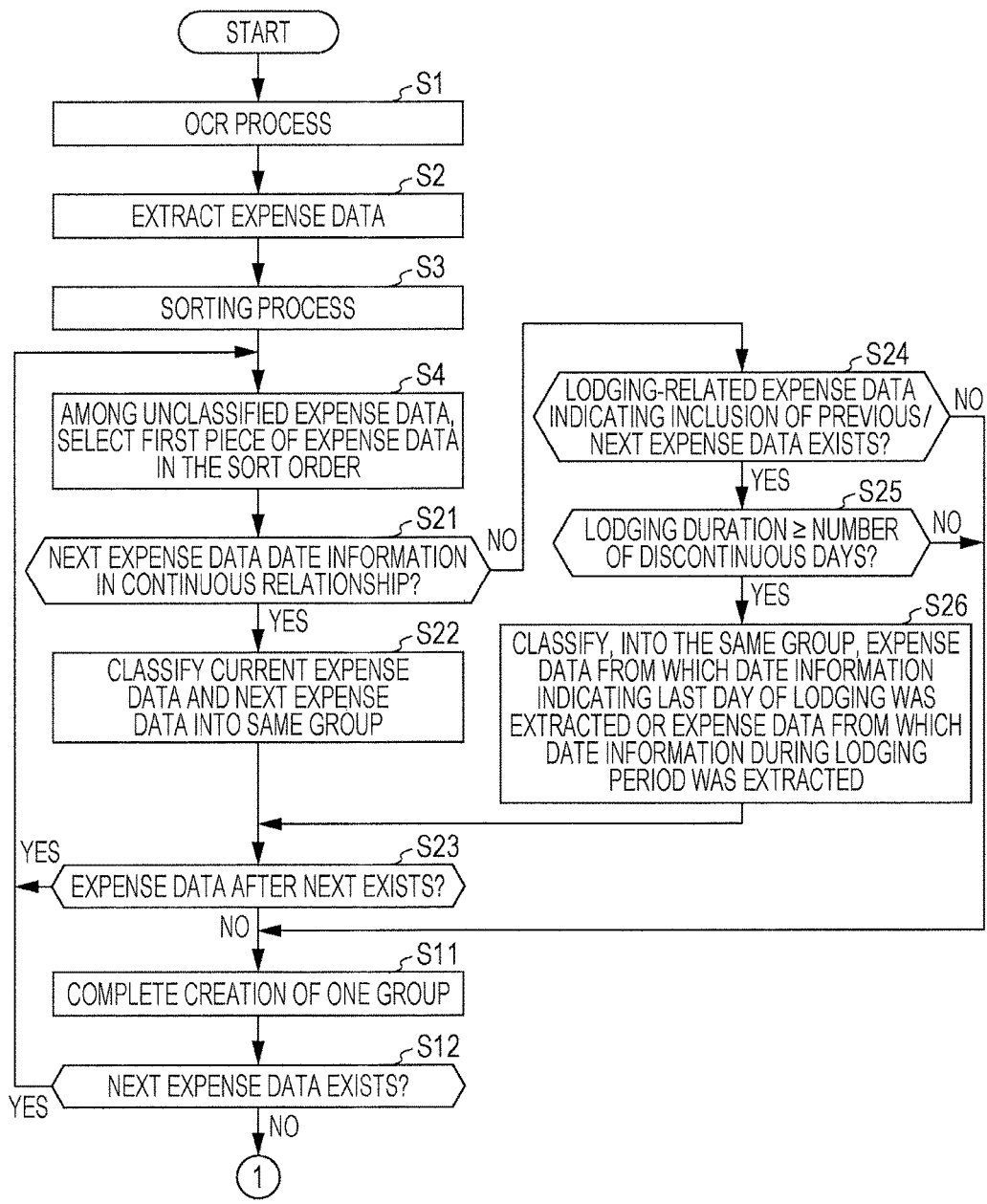
FIG. 10 is a flowchart illustrating a process for estimating an itinerary, conducted by an itinerary estimation device according to a second exemplary embodiment of the present invention.

FIG. 10 is a flowchart illustrating a process for estimating an itinerary, conducted by the itinerary estimation device 10. FIGS. 11A and 11B are diagrams explaining expense data.

After an image of each document in the document group D is captured by the image capture device 30, the text recognition unit 11 conducts an OCR process on the basis of the captured images (step S1). After the OCR process is conducted, the extraction unit 12 extracts expense data on the basis of text recognized from the images (step S2). FIG. 11A illustrates multiple pieces of expense data extracted in step S2. Next, the classification unit 14 conducts a sorting process that sorts the expense data extracted in step S2 according to the chronological order of the date information (step S3). FIG. 11B illustrates the result of the sorting process on the multiple pieces of expense data described using FIG. 11A.

Next, the classification unit 14 starts a process of classifying each piece of expense data among the multiple pieces of expense data into groups.

First, the classification unit 14 selects, from among the expense data that has not been classified into a group, the first piece of expense data in the sort order as the current piece of expense data to process (step S4). Herein, the classification unit 14 selects the expense data with the ID "0010" as the current piece of expense data to process.

Next, the classification unit 14 determines whether or not the current piece of expense data selected in step S4 and the next piece of expense data in the sort order include date information existing in a continuous relationship (step S21). At this point, the date information "09/20/2014 08:41" of the expense data with the ID "0010" and the date information "09/21/2014" of the expense data with the ID "0009" that is next in the sort order exist in a continuous relationship, and thus the classification unit 14 determines "Yes" in step S21. In this case, the classification unit 14 classifies the current piece of expense data and the next piece of expense data in the sort order into the same group (step S22). As illustrated in FIG. 12, the classification unit 14 classifies the expense data with the IDs "0009" and "0010" into a group G4. Next, the classification unit 14 determines whether or not a second piece of expense data exists after the next in the sort order from the current piece of expense data selected in step S4 (step S23). The piece of expense data after the next is expense data that has not been classified into a group yet. Herein, "Yes" is determined in step S23, and the classification unit 14 returns to the process in step S4.

Next, in step S4 the classification unit 14 selects the expense data with the ID "0009" as the current piece of expense data to process. Subsequently, the classification unit 14 determines whether or not the date information of the expense data with the ID "0009" and the date information of the expense data with the ID "0004" that is next in the sort order exist in a continuous relationship (step S21). At this point, the classification unit 14 likewise determines "Yes" in step S21, and classifies the expense data with the ID "0004" into the group G4 (step S22).

Next, in step S4 the classification unit 14 selects the expense data with the ID "0004" as the current piece of expense data to process. Subsequently, the classification unit 14 determines whether or not the date information of the expense data with the ID "0004" and the date information of the expense data with the ID "0013" exist in a continuous relationship (step S21). The date information "09/22/2014 08:34" of the expense data with the ID "0004" and the date information "11/05/2014 09:36" of the expense data with the ID "0013" do not exist in a continuous relationship. Consequently, the classification unit 14 determines "No" in step S21.

Next, the classification unit 14 determines whether or not there exists lodging-related expense data indicating that time before or after the date information extracted from the current piece of expense data selected in step S4 is included in the lodging period (step S24). As described in FIG. 1C, sometimes the receipt from a lodging facility such as a hotel states dates for specifying the lodging period. From the existence of such a document, it may be estimated that the user was present at the location of the lodging facility during the lodging period.

At this point, suppose that the expense item information of the expense data with the ID "0009" is "Hotel", and the lodging period is from September 21 to September 22. In this case, the classification unit 14 determines "Yes" in step S24. Next, the classification unit 14 determines whether or not the lodging duration specified from the expense data is at least the number of discontinuous days in the date information (in other words, lodging duration≥number of discontinuous days) (step S25). Herein, since the lodging period is from September 21 to September 22, the lodging duration is "2". In contrast, the number of discontinuous days in the date information is the number of days from "09/22/2014 08:34" to "11/05/2014 09:36", and thus is greater than the lodging duration. Consequently, the classification unit 14 determines "No" in step S25. In this case, the classification unit 14 completes the creation of one group (step S11). Herein, the expense data classified into the group G4 is finalized.

Next, the classification unit 14 determines whether or not next expense data exists in the sort order (step S12). The classification unit 14 determines "Yes" in step S12, and returns to the process in step S4.

Thereafter, the classification unit 14 repeats the processing steps from step S4 to step S12. As illustrated in FIG. 12, after classifying the expense data with the ID "0013" into a group G5, in step S4 the classification unit 14 selects the expense data with the ID "0014" as the current piece of expense data to process. In this case, the date information "11/06/2014" of the expense data with the ID "0014" and the date information "11/08/2014 12:11" of the expense data with the ID "0005" that is next in the sort order do not exist in a continuous relationship. Consequently, the classification unit 14 determines "No" in step S21.

Next, the classification unit 14 determines whether or not there exists lodging-related expense data indicating that time before or after the date information extracted from the current piece of expense data selected in step S4 is included in the lodging period (step S24). At this point, suppose that the expense item information of the expense data with the ID "0014" is "Hotel", and the lodging period is from November 6 to November 7. In this case, the classification unit 14 determines "Yes" in step S24.

Next, the classification unit 14 determines whether or not the lodging duration specified from the expense data is at least the number of discontinuous days in the date information (step S25). Herein, since the lodging period is from November 6 to November 7, the lodging duration is "2". Meanwhile, the number of discontinuous days in the date information is "2", which is the number of days from "11/06/2014" to "11/08/2014 12:11". Consequently, the classification unit 14 determines "Yes" in step S25. In this case, the classification unit 14 classifies in the same group the expense data from which date information indicating the final day of lodging (that is, the day of check-out) was extracted or the expense data from which date information during the lodging period was extracted (step S26). Herein, the classification unit 14 classifies into the group G5 the expense data from which the date information November 8 indicating the final day of lodging or date information during the lodging period from November 6 to November 7 was extracted. Consequently, even though the date information of the expense data with the ID "0005" does not exist in a continuous relationship with the date information of the expense data with the ID "0014", these pieces of expense data are classified into the same group G5. Next, the classification unit 14 proceeds to step S23, and determines whether or not a second piece of expense data exists after the next in the sort order from the current piece of expense data selected in step S4.

Regarding the creation of the group G6, the date information of the expense data with the ID "0011" and the date information of the expense data with the ID "0001" do not exist in a continuous relationship. However, suppose that the expense item information of the expense data with the ID "0011" relates to "Hotel", and the lodging period is from November 12 to November 13. In this case, the lodging duration is "2", and the number of discontinuous days in the date information is "2". Consequently, the classification unit 14 determines "Yes" in step S25, and classifies into the same group the expense data from which the date information November 14 indicating the final day of lodging or date information during the lodging period from November 12 to November 13 was extracted. Herein, even though the date information of the expense data with the ID "0001" does not exist in a continuous relationship with the date information of the expense data with the ID "0011", the classification unit 14 classifies these pieces of expense data into the same group G6.

Note that likewise in the present embodiment, the classification unit 14 may also classify expense data into groups on the basis of hometown information. In this case, after determining "Yes" in step S22, the classification unit 14 determines whether or not the location information of the next piece of expense data in the sort order indicates hometown information. In the case of determining that hometown information is indicated, the classification unit 14 completes the creation of one group in step S11. In the case of determining that hometown information is not indicated, the classification unit 14 proceeds to step S23, and determines whether or not a second piece of expense data after the next exists.

As above, after the classification of expense data by the classification unit 14 ends, the estimation unit 15 proceeds to step S13 described using FIG. 5, and estimates one itinerary unit for each group. Thereafter, in the itinerary estimation device 10, the processing from step S13 to step S20 is executed in the same way as the foregoing first exemplary embodiment. FIG. 13 is a diagram explaining expense data after the correction process. As illustrated in FIG. 13, the location information of the expense data with the ID "0002" is corrected from "Osuka" to "Osaka" by the correction process, and "Kobe" is supplemented as the location information of the expense data with the ID "0012" by the supplementation process. In addition, the expense data with the ID "0008" is eliminated by the elimination process based on the elimination condition (C22).

FIG. 14 is a diagram explaining an itinerary output from the output processor 18. Itinerary information according to the present exemplary embodiment is generated according to roughly the same method as the foregoing first exemplary embodiment.

As illustrated in FIG. 14, the "Itinerary 4" estimated from the group G4 includes information indicating that the user was present in Tokyo on Sep. 20, 2014, was present and stayed for two nights in Odawara on Sep. 21, 2014, and was present in Tokyo on Sep. 23, 2014. Herein, the presence in Tokyo on Sep. 23, 2014 is indicated in parentheses. Additionally, the part of the route related to the end point of the itinerary is also indicated in parentheses. The reason for this is because expense data indicating that the user returned to the hometown of Tokyo on September 23 does not exist. In "Itinerary 4", the final day of lodging is estimated to be the end of the itinerary, on the basis of the lodging-related expense data with the ID "0009".

The "Itinerary 5" estimated from the group G5 and the "Itinerary 6" estimated from the group G6 also include information about the user's actions on trips. In group G5, expense data on November 7 does not exist, and in group G6, expense data on November 13 does not exist, but one itinerary unit is respectively estimated from each on the basis of the lodging-related expense data discussed above.

According to the itinerary estimation device 10 in accordance with the second exemplary embodiment described above, one itinerary unit is estimated on the basis of two or more pieces of expense data whose date information exists in a continuous relationship, and thus an itinerary may be estimated accurately. Also, according to the itinerary estimation device 10, even when date information does not exist in a continuous relationship, one itinerary unit may be estimated accurately on the basis of lodging-related expense data.

EXEMPLARY MODIFICATIONS

The present invention may also be carried out in embodiments different from the foregoing exemplary embodiment. Furthermore, an exemplary embodiment may also be combined with each of the exemplary modifications indicated below.

Exemplary Modification 1

The itinerary estimation device 10 may also be equipped with a configuration for querying the user for information when such information is not extracted from the expense data. Information may not be extracted from the expense data in cases such as when a document does not state the information, or when a document does state the information, but the information is not extracted due to a text recognition error caused by the OCR process.

FIG. 15 is a block diagram illustrating a functional configuration of the itinerary estimation device 10 according to the present exemplary modification. The itinerary estimation device 10 according to the present exemplary modification is equipped with the functions of the foregoing exemplary embodiments, as well as a querying unit 19 and a response receiving unit 20.

The querying unit 19 queries the user for information when such information is not extracted from a piece of expense data. The response receiving unit 20 receives the response to the query by the querying unit 19. The estimation unit 15 supplements the information that was not extracted on the basis of the response received by the response receiving unit 20. The estimation unit 15 estimates an itinerary using the supplemented information.

Note that the querying unit 19 is realized by the controller 101 and the display unit 104, for example, while the response receiving unit 20 is realized by the controller 101 and the operating unit 102, for example.

FIG. 16 is a diagram illustrating a query conducted by the itinerary estimation device 10 according to the present exemplary modification. FIG. 16 illustrates a query screen C for querying for the location information of the expense data with the ID "0011" described using FIG. 6. As illustrated in FIG. 16, the querying unit 19 displays the date information, expense item information, and monetary amount extracted from the expense data with the ID "0011", and queries for the location information. At this point, the querying unit 19 displays the message "Is 'Kobe' the correct location?" on the basis of location information estimated by the supplementation process, an image B1 of an operating element labeled "Yes", and an image B2 of an operating element labeled "Edit Manually". If the user judges that the presented location information is correct, the user responds by performing an operation of selecting the image B1. If the user judges that the presented location information is incorrect, the user performs an operation of selecting the image B2, and responds with the true information.

Note that when multiple candidates for the location information exist, the querying unit 19 may also prioritize the display of location information from expense data whose extracted date information is close in time. Herein, prioritizing the display refers to enabling the location information to be selected with fewer operations, or displaying the location information in a way that is more visible to the user, such as displaying the location information at the top of the screen, for example.

Herein, location information estimated by the supplementation process is displayed, but such information may also not be displayed. Likewise, in the itinerary estimation device 10, when date information, expense item information, or the monetary amount is not extracted, the information that was not extracted may be queried.

The query timing of the querying unit 19 is not particularly limited. For example, in the case of determining that unknown information exists during the process of estimating an itinerary, the querying unit 19 may query immediately by displaying a prompt or the like. In addition, the query timing may also be a timing after the process in step S16 ends, or at the timing of estimating an itinerary in step S13, for example.

According to the itinerary estimation device 10 in accordance with the present exemplary modification, supplementation with true information becomes easier. In addition, the functions of the present exemplary modification may also be realized by the itinerary estimation device 10 according to the foregoing second exemplary embodiment.

Exemplary Modification 2

The supplementation process in the foregoing exemplary embodiments is a process of supplementing location information, but a supplementation process of supplementing time information may also be conducted. The algorithm of the supplementation process in this case is predetermined, and is conducted on the basis of the following supplementation condition (C42).

(C42) Supplement date information not extracted from one piece of expense data on the basis of date information extracted from other expense data sharing the same location in common as indicated by the extracted location information.

Figure 17:
FIG. 17 is an explanatory diagram illustrating a supplementation process conducted by an itinerary estimation device according to an exemplary modification 2 of the present invention.

As used herein, sharing the same location in common may mean that the same location information is shared in common, but may additionally include sharing the same region in common, such as "Fukuoka" and "Hakata-ku", which is a district constituting part of Fukuoka. As illustrated in FIG. 17, provided that the date information of the expense data with the ID "0008" is "Unknown", the group into which to classify the expense data is unknown. Accordingly, the estimation unit 15 specifies the expense data with the IDs "0015" and "0002" as expense data whose extracted location information indicates a location shared in common with the location information "Osaka" of the expense data with the ID "0008". The date information of the expense data with the ID "0015" is "11/10/2014 15:17", and the date information of the expense data with the ID "0002" is "11/11/2014 12:16". Accordingly, the estimation unit 15 supplements the date information of the expense data having the ID "0008" with the date information extracted from these pieces of expense data. Herein, the estimation unit 15 supplements on the basis of "11/10" and "11/11". For example, the estimation unit 15 estimates an itinerary by supplementing with one of these two pieces of date information.

Exemplary Modification 3

The amendment process in the foregoing exemplary embodiments is a process of amending location information, but an amendment process of amending time information may also be conducted. The algorithm of the amendment process in this case is predetermined, and is conducted on the basis of the following amendment condition (C32).

(C32) Amend date information extracted from one piece of expense data on the basis of date information extracted from other expense data sharing the same location in common as indicated by the extracted location information.

When the date information of a piece of expense data includes an error caused by the OCR process, the expense data may not be classified into the appropriate group. Accordingly, when there exists other expense data whose extracted location information indicates a location shared in common, the estimation unit 15 supplements with the date information extracted from that other expense data. For example, suppose that the text recognition unit 11 recognizes "Fukuoka" as the location information, and mistakenly recognizes the date information "6/5" as "6/S" (the letter "S"). In this case, if "6/5" is extracted as the date information from two or more pieces of expense data from which "Fukuoka" was extracted as the location information, the classification unit 14 amends "6/S" to "6/5".

Exemplary Modification 4

Regarding the foregoing second exemplary embodiment, the itinerary estimation device 10 may also conduct group classification on the basis of whether or not the location indicated by the location information extracted from the expense data is remote from the hometown. In the present exemplary modification, suppose that the registration unit 13 registers a hometown.

When the user visits a remote location from the hometown for a purpose such as tourism or a business trip, it is estimated that the user is unlikely to visit the same location multiple times a few days apart. In the group G6 in the foregoing second exemplary embodiment, even though the hometown is "Tokyo", there exist two pieces of expense data whose date information indicates November 10 and November 12, and whose location information indicates the remote location of "Osaka" for both. In this case, even though a document indicating an overnight stay during the period from November 10 to November 11 does not exist, it is estimated that the user stayed overnight at this location, and these pieces of expense data correspond to documents related to expenses that were issued on the same itinerary. In contrast, if the date information had indicated November 10 and November 12, and the location information had indicated the non-remote location of "Yokohama", estimating that the expense data was issued on the same trip would be less likely.

Accordingly, even if the date information extracted from one piece of expense data and the date information extracted from the next piece of expense data in the sort order do not exist in a continuous relationship, the classification unit 14 classifies the expense data into the same group when the location information extracted from these pieces of expense data indicates a location shared in common, and the location is a remote location from the hometown. Whether or not a location is remote from the hometown is typically determined according to the distance between the hometown and the remote location. However, the determination may be based not only on distance, but also take into account means of transportation for visiting the location from the hometown, for example. For example, even if two locations are equally distant, the location that is difficult to reach may be classified a remote location, whereas the location that is easy to reach may be classified a non-remote location. According to the present exemplary modification, for "Itinerary 6" described using FIG. 14, the itinerary estimation device 10 estimates that the itinerary additionally includes the information "11/10/2014-11/11/2014 Osaka (lodging 2 nights)". According to the itinerary estimation device 10 in accordance with the present exemplary modification, the accuracy of estimating the true itinerary increases.

Exemplary Modification 5

Figure 18:
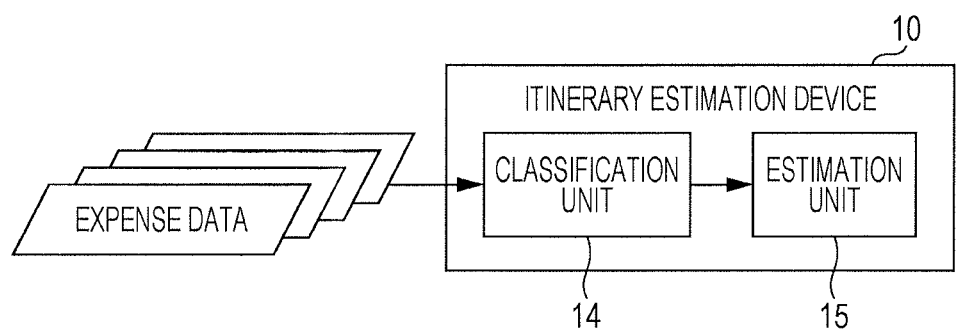
FIG. 18 is a block diagram illustrating a functional configuration of an itinerary estimation device according to an exemplary modification 5 of the present invention.

The itinerary estimation device 10 may also not be equipped with all of the functional elements described using FIG. 2. As illustrated in FIG. 18, it is sufficient for the itinerary estimation device 10 to include at least the classification unit 14 and the estimation unit 15. In this case, the functions of at least some of the text recognition unit 11, the extraction unit 12, the registration unit 13, the presentation unit 16, the selection receiving unit 17, and the output processor 18 may be realized by an external device, or some functions may even be omitted.

As an aspect of the itinerary estimation device 10 according to the present exemplary modification, a configuration that obtains expense data from documents may also not be adopted. It is becoming increasingly common for receipts, statements from credit card companies or banks, and various kinds of tickets to be issued electronically. Accordingly, the itinerary estimation device 10 may also acquire electronic expense data that includes information related to expenses from an external device, and estimate an itinerary on the basis of the expense data. This is because such expense data may also include information such as date information, location information, expense item information, and monetary amount information with the same properties as in the case of the document described using FIG. 1. For example, expense data may be extracted from data included in statement data for a corporate card, which is a type of credit card. Since the statement data for a corporate card includes expense data for each user of the card, the itinerary estimation device 10 according to the present exemplary modification is also capable of estimating an itinerary on the basis of expense data for each user.

In addition, as another aspect of the itinerary estimation device 10 according to the present exemplary modification, a configuration that obtains expense data from documents and a configuration that acquires electronic data including information related to expenses from an external device may be provided. This is because the present invention is also applicable to a mixture of expense data obtained from documents and electronic data related to expenses obtained from an external device.

Furthermore, some of the functions of the estimation unit 15 may also be omitted. The estimation unit 15 may be configured to not conduct one or more of the elimination process, the amendment process, and the supplementation process, or some of the foregoing conditions related to these process may be omitted, for example.

Also, it is sufficient for the information to be extracted from expense data to include at least date information, and some from among location information, expense item information, and monetary amount may also be excluded from extraction.

Exemplary Modification 6

Furthermore, the present invention may also be specified as an information classification method that, on the basis of a continuity of date information or a continuity of location information at multiple times extracted from each of multiple pieces of issued information, classifies the multiple pieces of issued information into one or more information groups. In other words, these pieces of information are issued without consideration of links between information or classification into the above information group. One information group may include information that may be used as a clue to estimate a certain collection of actions by a person, such as a series of actions, for example, but other information may also be included in some cases. A continuity of date information may be specified by a predetermined continuous relationship existing between two or more pieces of date information. A continuity of location information may be specified by a predetermined continuous relationship existing between pieces of location information at multiple times. The continuous relationship is determined on the basis of the geographical positions of the locations indicated by the location information. In the exemplary embodiment discussed above, an information classification method according to the present invention is applied to an invention that estimates an itinerary, but may also be applied to an invention that estimates the actions of people at times other than during travel.

Exemplary Modification 7

The functions realized by the itinerary estimation device 10 according to each of the exemplary embodiments discussed above may each be realized by one or multiple hardware circuit, be realized by executing one or multiple programs causing a computer to realize the same functions, or be realized by a combination of the above. When the functions of the itinerary estimation device 10 are realized using a program, the program (for example, the itinerary estimation application AP) may be provided by being stored on a non-transitory computer-readable storage medium such as a magnetic recording medium (such as magnetic tape, a magnetic disk (including an HDD and a flexible disk (FD), or the like), an optical recording medium (such as an optical disc), a magneto-optical recording medium, or flash memory. Alternatively, the program may be delivered via a communication link such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An itinerary estimation device comprising:
at least one hardware processor configured to implement:
a classification unit that classifies a plurality of pieces of expense data including information related to expenses into one or more expense data groups, according to a chronological order of date information extracted from each of the plurality of pieces of expense data; and
an estimation unit that estimates an itinerary that includes at least dates on the basis of information including date information extracted from each piece of classified expense data included in the expense data group, wherein
the classification unit further determines a start point of the itinerary according to location information indicated by at least one of the plurality of pieces of expense data.

2. The itinerary estimation device according to claim 1, wherein the at least one hardware processor is further configured to implement:
a registration unit that registers a location that is potentially the start point or an end point of an itinerary, wherein
the classification unit conducts a classification that defines boundaries between the expense data groups according to expense data from which registered location information indicating the registered location was extracted, and
the estimation unit estimates one itinerary unit on the basis of information including date information and location information extracted from each piece of expense data included in one of the expense data groups.

3. The itinerary estimation device according to claim 2, wherein
the classification unit conducts a classification that defines boundaries between the expense data groups by associating, from among expense data from which the registered location information was extracted, odd-numbered expense data in the chronological order with the start point, and even-numbered expense data with the end point.

4. The itinerary estimation device according to claim 2, wherein
the classification unit defines boundaries between the expense data groups by associating, from among expense data from which the registered location information was extracted, and for which the registered location information is included in two or more pieces of expense data whose extracted date information exists in a continuous relationship, the first piece of expense data in the chronological order with the start point, and the last piece of expense data with the end point.

5. The itinerary estimation device according to claim 2, wherein
if the registered location information is extracted from each of two or more pieces of expense data whose extracted date information exists in a continuous relationship, the classification unit defines boundaries between the expense data groups by associating the earlier piece of expense data in the chronological order with the end point of one itinerary unit, and the later piece of expense data with the start point of another itinerary unit.

6. The itinerary estimation device according to claim 2, wherein
the estimation unit estimates an itinerary unit on the basis of a route of movement estimated from geographical relationships among a plurality of pieces of location information extracted from each piece of expense data included in one expense data group.

7. The itinerary estimation device according to claim 1, wherein
the classification unit classifies two or more pieces of expense data whose extracted date information exists in a continuous relationship into the same expense data group, and
the estimation unit estimates one itinerary unit on the basis of information including date information extracted from each piece of expense data included in one of the expense data groups.

8. The itinerary estimation device according to claim 7, wherein
even if the date information extracted from one piece of expense data does not exist in a continuous relationship with the date information extracted from another piece of expense data that is next in the chronological order, the classification unit classifies the one piece of expense data and the other piece of expense data into the same expense data group in a case in which there exists expense data indicating that the respectively extracted pieces of date information are included in a lodging period.

9. The itinerary estimation device according to claim 7, wherein the at least one hardware processor is further configured to implement:
a registration unit that registers a location that is potentially a start point or an end point of an itinerary, wherein
even if the date information extracted from one piece of expense data does not exist in a continuous relationship with the date information extracted from another piece of expense data that is next in the chronological order, the classification unit classifies the one piece of expense data and the other piece of expense data into the same expense data group in a case in which the location information extracted from the one piece of expense data and the other piece of expense data indicates a location shared in common, and also indicates a remote location from the registered location.

10. The itinerary estimation device according to claim 1, wherein
the estimation unit supplements location information not extracted from one piece of expense data on the basis of location information extracted from other expense data classified into the same expense data group.

11. The itinerary estimation device according to claim 1, wherein
the estimation unit supplements date information not extracted from one piece of expense data on the basis of date information extracted from other expense data sharing the same location in common as indicated by the extracted location information.

12. The itinerary estimation device according to claim 1, wherein
the estimation unit amends location information extracted from one piece of expense data as a result of recognizing text included in an image on the basis of location information extracted from other expense data included in the same expense data group.

13. The itinerary estimation device according to claim 1, wherein the estimation unit amends date information extracted from one piece of expense data as a result of recognizing text included in an image on the basis of date information extracted from other expense data sharing the same location in common as indicated by the extracted location information.

14. The itinerary estimation device according to claim 1, wherein
the estimation unit eliminates expense data not used for itinerary estimation from the plurality of pieces of expense data.

15. The itinerary estimation device according to claim 14, wherein
the estimation unit eliminates expense data from which some location information was extracted, on the basis of geographical relationships among a plurality of pieces of location information extracted from each piece of expense data included in one expense data group.

16. The itinerary estimation device according to claim 14, wherein
the estimation unit eliminates the expense data that is not used on the basis of an item of expense included in the expense data.

17. The itinerary estimation device according to claim 1, wherein the at least one hardware processor is further configured to implement:
a querying unit that queries for information in a case in which the information is not extracted from a piece of expense data; and
a response receiving unit that receives a response to the query, wherein
the estimation unit supplements the information that was not extracted on the basis of the received response.

18. The itinerary estimation device according to claim 1, wherein the at least one hardware processor is further configured to implement:
a presentation unit that presents a plurality of possible itineraries in a case in which the plurality of possible itineraries are estimated on the basis of one expense data group;
a selection receiving unit that receives a selection of an itinerary from among the presented plurality of possible itineraries; and
an output processor that conducts a process of outputting information about an itinerary on the basis of the received selection.

19. The itinerary estimation device according to claim 1, wherein the classification unit further determines the start point of the itinerary according to a determination whether the location information comprises a predetermined location, and
the start point of the itinerary is an earliest date indicated by the itinerary.

20. The itinerary estimation device according to claim 19, wherein the plurality of pieces of expense data are listed according to the chronological order, and
the classification unit is further configured, in response to determining that a first piece of the pieces of expense data and a second piece of expense data both indicate the predetermined location, to set the start point according to:
a first determination comprising setting the first piece as the start point in response to determining that the first piece is listed before the second piece in the chronological order,
a second determination comprising setting the first piece as the start point in response to determining that another piece of the plurality of pieces of expense data is listed between the first piece and the second piece in the chronological order and that a first continuous relationship of consecutive days is indicated by the date information from the first piece to another piece to the second piece, and
a third determination comprising setting the second piece as the start point in response to determining that the other piece is not listed between the first piece and the second piece in the chronological order and that a second continuous relationship of consecutive days is indicated by the date information between the first piece and the second piece.

21. The itinerary estimation device according to claim 20, wherein the classification unit is further configured, in response to setting the start point according to the first determination, the second determination and the third determination, to further set the start point by more greatly weighting one of plurality of the first determination, the second determination and the third determination.

22. An itinerary estimation method performed by at least one hardware processor, the method comprising:
classifying a plurality of pieces of expense data including information related to expenses into one or more expense data groups, according to a chronological order of date information extracted from each of the plurality of pieces of expense data; and
estimating an itinerary that includes at least dates on the basis of information including date information extracted from each piece of classified expense data included in the expense data group, wherein
classifying the plurality of pieces of expense data further comprises determines a start point of the itinerary according to location information indicated by at least one of the plurality of pieces of expense data.

23. A non-transitory computer readable medium storing a program causing a computer to execute a process for estimating an itinerary, the process comprising:
classifying a plurality of pieces of expense data including information related to expenses into one or more expense data groups, according to a chronological order of date information extracted from each of the plurality of pieces of expense data; and
estimating an itinerary that includes at least dates on the basis of information including date information extracted from each piece of classified expense data included in the expense data group, wherein
classifying the plurality of pieces of expense data further comprises determines a start point of the itinerary according to location information indicated by at least one of the plurality of pieces of expense data.

24. An information classification method performed by at least one hardware processor, the method comprising:
classifying, on the basis of a continuity of date information or a continuity of location information at a plurality of times extracted from each of a plurality of pieces of independently issued information, each of the plurality of pieces of information into one or more information groups, wherein the pieces of information comprise a plurality of pieces of expense data; and
determining a start point of an itinerary according to the location information indicated by at least one of the plurality of pieces of expense data.

* * * * *